Patented June 8, 1937

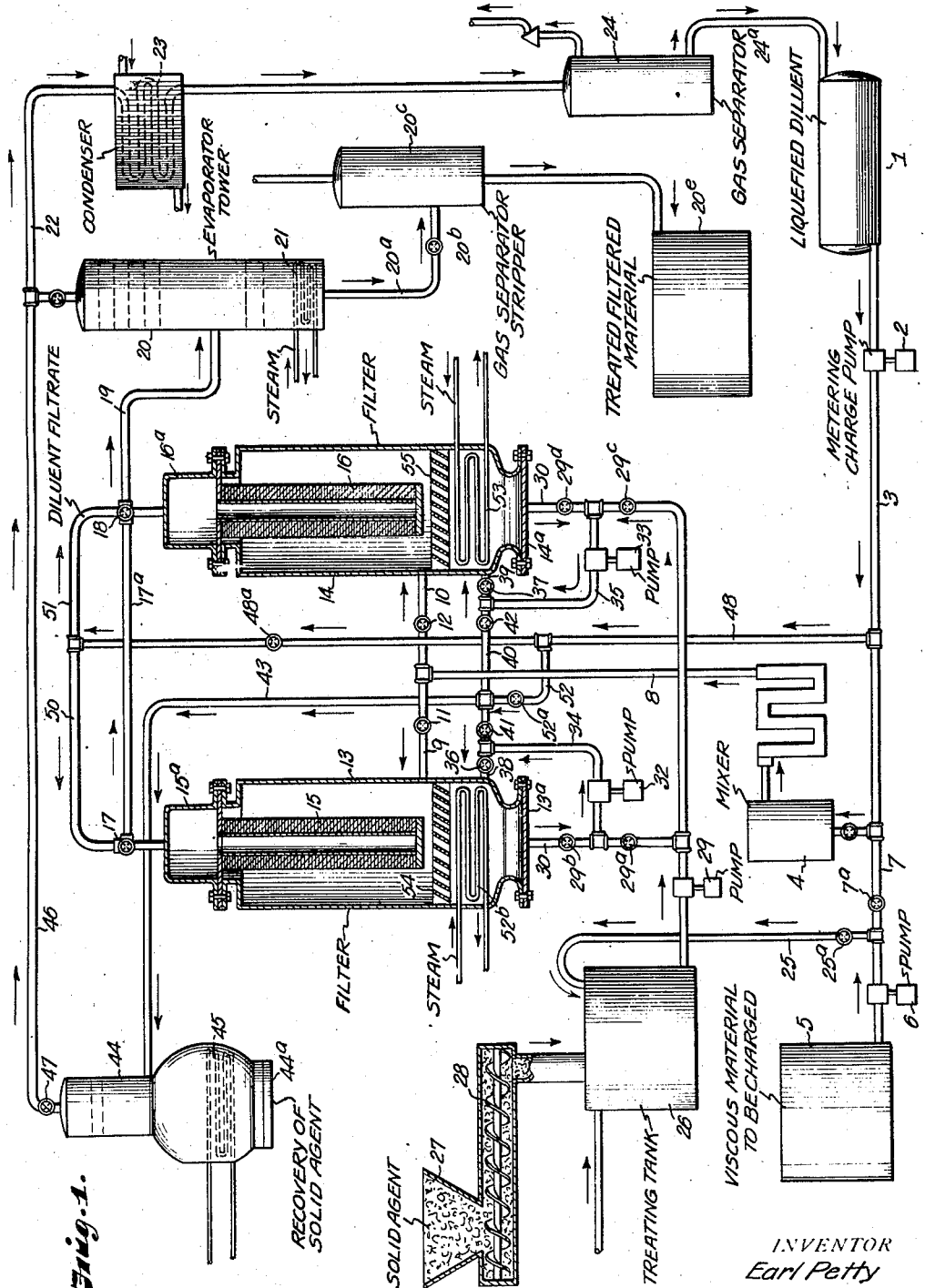

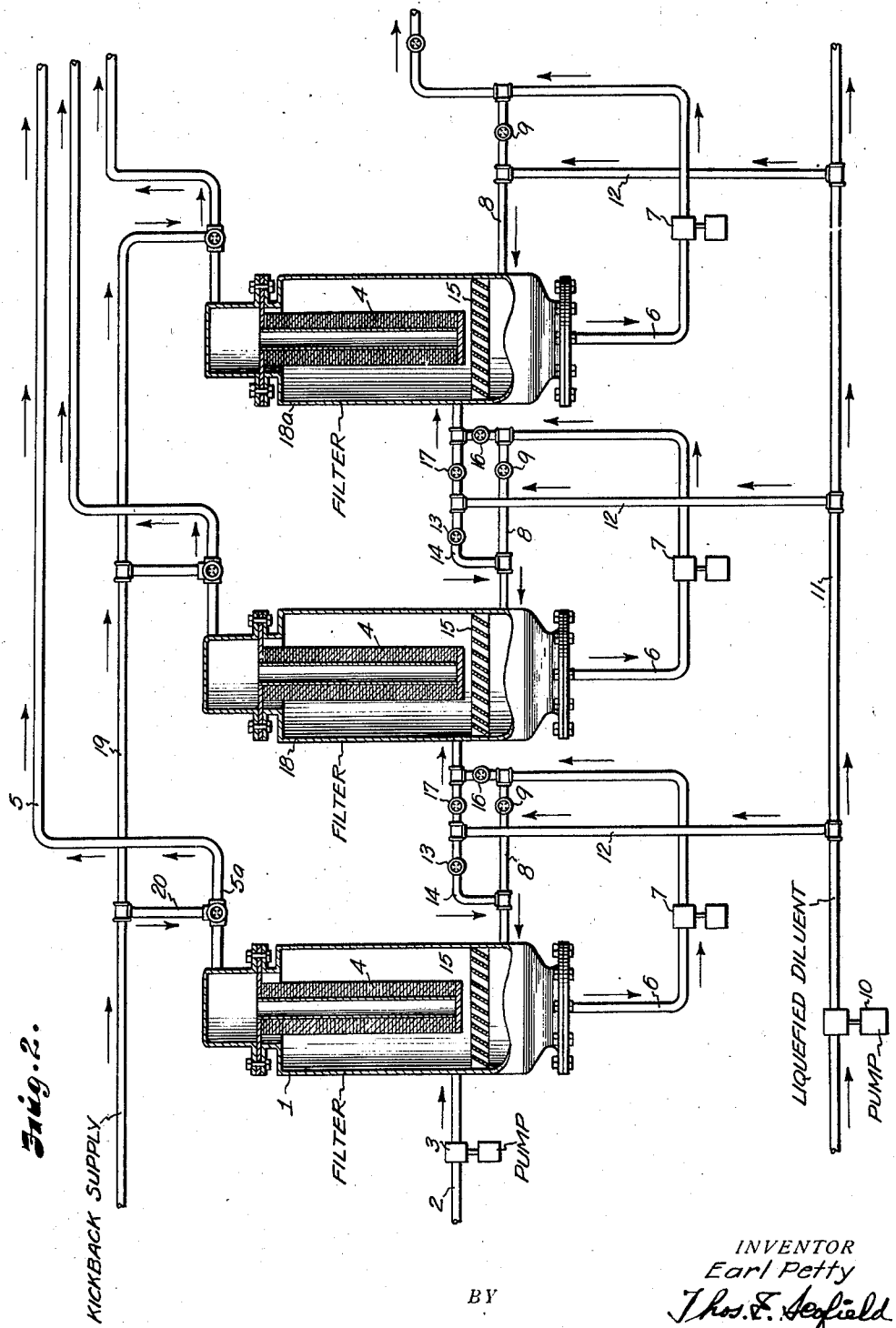

2,082,847

UNITED STATES PATENT OFFICE 2,082,847

METHOD OF AND APPARATUS FOR FILTERING HIGH VISCOSITY LIQUIDS

Earl Petty, New York, N. Y., assignor to Alco Products, Incorporated, New York, N. Y., a corporation of Delaware Application September 21, 1933, Serial No. 690,385

4 Claims. (Cl. 210—177)

My invention relates to a novel process and apparatus for filtration and more particularly to a filtration process wherein a low viscosity diluent is used to control the rate of filtration.

It is known in the art that liquids bearing finely divided solids in suspension, or colloids in solution, may be effectively filtered by means of apparatus such as that disclosed in Patents Numbers 1,690,537, 1,744,510, and 1,773,797, granted to H. S. Hele-Shaw. This type of filter comprises a large number of superimposed discs of paper, glass, mica, or such material forming a column having a central passageway serving as an outlet for the filtered liquid. The rate of filtration is governed by the number of discs per unit of filter length, i. e., the mesh, and the film tension between the discs as the liquid flows from the exterior to the central passageway. In most cases the rate of liquid flow through such a filter is too low to be commercially feasible, due to too high liquid viscosity.

One object of my invention is to provide a novel method for increasing the rate of filtration and clarifying of the Hele-Shaw type filter units by lowering the viscosity of the liquid to be filtered by the addition of a proper amount of a low viscosity diluent.

Another object of my invention is to provide a filtration system permitting of continuous operation.

Still another object of my invention is to provide a method of filtration in which the diluent is continuously recovered and recycled in the system.

A further object of my invention is to provide a multi-stage system of filtration in which caking of the slurry formed is prevented.

A still further object of my invention is to make use of a diluent which will bring in addition the feature of not only low viscosity but also a low density of the solution making separation effective, the separation being by a combination of gravity and positive filtration on decanted liquid.

A still further object of my invention is to provide a filter chamber having a baffle system to prevent turbulence in the chamber as a result of the agitation of the slurry by recycling.

In general, my invention contemplates the admixing of a liquefied gas having a viscosity of .003 poise or less at 15° C., such as methane, ethane, propane, ethylene, or $CO_2$ with liquids having viscosities above .01 poise containing in solution, or suspension, finely divided solids, pigments or colloidal material to be filtered out and passing this mixture under pressure through a clarifying filter unit of the Hele-Shaw type fitted for "kick-back" operation for cleaning. There is thus provided a commercially feasible method of filtration adapted for the reclamation of crank case and transformer oils or cleaner's solvents such as naphtha, carbon tetrachloride, tri-chloro-ethylene, etc., and for general filtration.

In the accompanying drawings which form part of the instant specification and which are to be read in conjunction therewith:

Figure 1 shows a schematic view of one form of apparatus capable of carrying out the process of my invention.

Figure 2 shows a schematic view of another form of apparatus capable of carrying out the process of my invention.

More particularly referring now to the drawings and especially Figure 1, liquid propane, or any suitable liquefied normally gaseous diluent, from tank 1 is forced by the metering charge pump 2 through the line 3. Similarly the viscous liquid to be filtered is drawn from tank 5 and forced by charge pump 6 through the line 7, having a shut-off valve 7ª, to the mixer 4 where it is diluted with the propane. The diluted liquid is forced, under pressure, through the line 8 into the branch lines 9—10 having shut-off valves 11—12 controlling the input into the filter chambers 13 and 14. Hele-Shaw type filters 15 and 16 are mounted within chambers 13 and 14 respectively. Fastening means, not shown, are provided to permit the removal of caps 15ª and 16ª with their associated filter units from the chambers 13 and 14. Two-way valves 17 and 18 are provided at the outlet of each filter and are interconnected through line 17ª. A line 19 leads from valve 18 to the evaporator tower 20 having heating element 21 in the bottom thereof. A vapor discharge pipe 22 connects the tower 20 with condenser 23 and gas separator 24, the latter being connected to the diluent tank 1 by line 24ª. An outlet pipe 20ª having a shut-off valve 20ᵇ connects the bottom of the tower 20 with the separator 20ᶜ which is in turn connected to the receiving tank 20.

Returning now to the filter chambers, a line 25 having a shut-off valve 25ª connects the viscous liquid feed line 7 with a treating slurry tank 26. A hopper 27 having a screw feed 28 or other equivalent mechanism is arranged with its outlet above tank 26. When it is desired to use a solid treating agent in the system, the charge pump 29, connected to tank 26, furnishes a means for forcing the slurry of viscous material and solid agent, to the chambers 13 and 14, by manipulation of the valves 29ª, 29ᵇ, 29ᶜ, and 29ᵈ. It is contemplated that the solid treating agent may be thus introduced either intermittently or continuously. A branch line 34 having a circulation pump 32 is connected between valves 29ª and 29ᵇ, and discharges into the lower portion of chamber 13 at 38. A shut-off valve 36 in line 34 controls the input into the chamber. Similarly, branch line 35 having pump 33 discharges into chamber 14 at 39 and is controlled by valve 37. An auxiliary line 40 having shut-off valves 41, 42 connects lines 34 and 36 and is connected by line 43 with the flash chamber 44 having a heating unit 45 and a removable bottom 44ª. A line 46 having shut-off valve 47 connects the upper portion of the flash chamber 44 with the line 22.

A line 48 having shut-off valve 48ª, connects the propane feed line 3 with the branch lines 50 and 51, connected to the two-way valves 17 and 18 respectively. An auxiliary line 52 having shut-off valve 52ª interconnects the line 48 with the junction of lines 40 and 43.

Each chamber, 13 and 14, is provided with a baffle 54 and 55 respectively, located within the chamber below the filter units 15 and 16 respectively. Heating units 52ᵇ and 53 are located in the bottoms of chambers 13 and 14 respectively.

The operation of the device is as follows. The liquefied diluent from tank 1 is mixed with the viscous liquid from tank 5 by the mixer 4 and fed into the chambers 13 and 14 above the baffles 54 and 55, through lines 9 and 10. The filtrate which passes through the units 15 and 16 is passed into tower 20 where the propane is evaporated by heating unit 21 and passes off through line 22 to the condenser 23. This condensate after passing through gas separator 24 is returned to the tank 1, thus completing the cycle. The solid material in the chambers 13 and 14 settles by gravity to the bottom where it is kept from caking by the constant circulation of slurry and treating agent (when agent is used) from tank 26, to which clay or other solid agent has been added from hopper 27. A constant circulation of the slurry in the bottom of each chamber is maintained at all times through the action of pumps 32 and 33 withdrawing slurry from the bottom of each chamber and refeeding it at 38 and 39. In order that the operation of the units may be continuous, the valves 41 and 42 may be opened thus allowing a constant bleeding of the slurry circulating through the branches 30, 34 and 30, 35. The slurry bled off through line 43 may be diluted by the addition of propane from line 52. This serves to maintain the fluidity of the slurry which passes into the flash chamber 44 through line 43. The heating unit 45 and the pressure reduction in 44 serves to vaporize the propane in the slurry which passes off through line 46 to the condenser 23 where it is recovered for reuse.

The caked slurry formed in the chamber 44 may be removed through the bottom of this chamber without shutting down the filtration units. Obviously, however, the bleeding through 43 may be dispensed with and the slurry in each tower 13, 14 permitted to cake and be removed through the bottom of each tower. The filtrate from each unit 15, 16 which has settled in tower 20 is drawn off through line 20ª, treated in gas separator stripper 20ᶜ, and the finally treated-filtered material passed through pipe 20ᵈ to the collecting drum 20ᵉ. The heating coils 52ᵇ, 53 in chambers 54, 55 serve to maintain the slurry in a liquid state while the baffles 54, 55 prevent the turbulence caused by the recycling slurry in the bottom of the chamber from disturbing the quiet zone above the baffles.

The solid material which collects around the filter units 15-16 may be removed by the introduction of liquid propane, or filtrate, or gas, through the "kick-back" line 48.

Referring now to Figure 2, a mixture of viscous liquid and propane is fed into the chamber 1 through the line 2 by the pump 3. The filtrate passed by the unit 4 is carried off through the line 5 having a three-way valve 5ª to an evaporator (not shown) where the propane is evaporated, condensed, and the liquid collected. The heavier component in the filter chamber is allowed to settle to the bottom of the chamber in a slurry-like liquid form. Time is not allowed for complete separation which would result in the formation of a cake or paste which could not be withdrawn without positive mechanical conveyors. The partially separated slurry is transferred into the next chamber through the line 6 having a pump 7. A portion of the slurry is recycled to the filter chamber through a branch 8 having a shut-off valve 9. At the same time liquid propane is forced by pump 10 through line 11, branch line 12, and shut-off valve 13 in line 14 into the slurry returning through line 8. The slurry is thus diluted and returned into the filter chamber below the baffle 15 which prevents the turbulence in the slurry from affecting the quiet zone of filtration. Means may be provided for returning the slurry at any one of a plurality of points along the side of the chamber depending upon the zone of separation which may readily be determined by sampling at these points. The remainder of the slurry in line 6 passes through shut-off valve 16 and is also diluted with liquid propane from line 12 which is connected through shut-off valve 17 to the slurry line from valve 16. The diluted slurry is then fed into the chamber 18 where the process is repeated. A kick-back line 19 is provided for feeding propane, or any suitable liquefied normally gaseous diluent, back through the filter to remove at will the accumulated wax or other solid material from around the edges of the filter unit. For example, propane from line 19 is fed back through branch 20 and three-way valve 5ª, and line 5 into the top of the filter unit. The operation may be repeated in chamber 18ª.

It will be observed that the distinguishing characteristic of the process is the dilution of a viscous liquid by a liquid hydrocarbon, or other suitable low viscosity liquid, whereby a mixture of low viscosity is achieved and a resulting rapid filtration may be had with a decanting clarifying filter of the Hele-Shaw type. It will be observed that I have accomplished the objects of my invention. I am enabled to maintain a continuous operation of the system without the formation of a cake or paste of slurry in the filter chambers thus avoiding the use of mechanical conveyors to remove the accumulated slurry.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

The operation is particularly adapted to the filtration of crank case oils, transformer oils, dry cleaner's solvents, though it is to be understood that it may be used with various filtering problems in general.

Having thus described my invention, what I claim is:

1. A method of separating finely divided solid material from viscous liquids containing the same, comprising diluting the viscous liquid with a liquefied normally gaseous diluent, passing the diluted liquid into a combined filtration and settling zone, continuously removing filtrate from said zone, maintaining a liquid slurry of the solid material in the settling zone by continuously removing slurry from the zone before complete settling of the solid material has taken place, passing the removed slurry to a second combined filtration and settling zone, removing filtrate from said second zone and maintaining a liquid slurry of the solid material in said second zone by continuously removing slurry from the zone before complete settling of the solid material has taken place.

2. A process as defined by claim 1 in which slurry removed from each zone is diluted with liquefied normally gaseous diluent and a portion of each diluted slurry returned to the zone from which it was withdrawn.

3. A filtering apparatus including in combination a plurality of combined filtering and settling chambers, a capillary film filter unit in each chamber, baffle means in each chamber below the filter units, means connecting the lower portion of successive chambers for transferring liquid from one chamber to the succeeding chamber and for returning a portion of the liquid to the chamber from which it was withdrawn and means connected to said last named means for adding a diluent to said liquid.

4. A filtering apparatus including in combination a plurality of filter chambers, a filter unit in each chamber, means connecting the lower portion of successive chambers for transferring liquid from one chamber to the succeeding chamber and for returning a portion of the liquid to the chamber from which it was withdrawn and means connected to said last named means for adding a diluent to said liquid.

EARL PETTY.